(12) United States Patent
Nakamura et al.

(10) Patent No.: US 12,060,233 B2
(45) Date of Patent: Aug. 13, 2024

(54) STICK PICK-UP DEVICE

(71) Applicant: HITEC CO., LTD., Yokohama (JP)

(72) Inventors: Tatsuo Nakamura, Yokohama (JP);
Katsuya Tanabe, Yokohama (JP);
Hirokatsu Harasawa, Yokohama (JP);
Shinya Yamada, Yokohama (JP)

(73) Assignee: HITEC CO., LTD., Yokohama (JP)

( * ) Notice: Subject to any disclaimer, the term of this patent is extended or adjusted under 35 U.S.C. 154(b) by 90 days.

(21) Appl. No.: 17/994,139

(22) Filed: Nov. 25, 2022

(65) Prior Publication Data

US 2023/0339697 A1   Oct. 26, 2023

(30) Foreign Application Priority Data

Apr. 21, 2022   (JP) ................. 2022-070160

(51) Int. Cl.
*B65G 47/06* (2006.01)
*A22C 11/00* (2006.01)
*B65G 47/82* (2006.01)

(52) U.S. Cl.
CPC ............ *B65G 47/06* (2013.01); *A22C 11/008* (2013.01); *B65G 47/82* (2013.01)

(58) Field of Classification Search
CPC ........ B65G 47/06; B65G 47/82; A22C 11/008
USPC ...................................................... 198/550.4
See application file for complete search history.

(56) References Cited

U.S. PATENT DOCUMENTS 1,134,669 A  *  4/1915  Chiniquy .............. F26B 15/122
                                                                  198/550.8

FOREIGN PATENT DOCUMENTS

| JP | 2016-086726 A | 5/2016 |
| JP | 2016-150825 A | 8/2016 |
| JP | 2019097539 A | * 6/2019 |

OTHER PUBLICATIONS

JP2016086726 (Year: 2016).*
CN209382890U (Year: 2019).*
CN115477154 (Year: 2022).*

* cited by examiner

*Primary Examiner* — Gene O Crawford
*Assistant Examiner* — Lester Rushin, III
(74) *Attorney, Agent, or Firm* — MCGINN I.P. LAW GROUP, PLLC.

(57) ABSTRACT

Provided is a stick pick-up device which has a simple structure, is easy to control, and is capable of reliably picking up sticks one by one. The stick pick-up device includes a stick stock portion, a reverse inclined wall, and a push-up portion. The stick stock portion includes a stick receiving portion that is inclined down toward a downstream side and can store a plurality of sticks. The reverse inclined wall is provided on the downstream side of the stick receiving portion, and has a reverse inclined surface inclined in a direction covering over a stick receiving portion side. The push-up portion is provided on a reverse inclined surface side, has a stick push-up surface inclined down toward the downstream side, pushes up the sticks on the stick push-up surface one by one along the reverse inclined surface, and causes the sticks to move downstream over the reverse inclined wall.

6 Claims, 4 Drawing Sheets

STICK PICK-UP DEVICE

BACKGROUND OF THE INVENTION

Field of the Invention

The present invention relates to a stick pick-up device, and more particularly to a stick pick-up device configured to pick up sticks for suspending food one by one.

Description of the Related Art

For example, in a sausage production line, a stick is used for suspending a chain of sausages. The stick is a rod-shaped object made of a columnar or cylindrical metal. A device configured to pick up such sticks one by one and feed the sticks to a downstream device has also been known in the related art.

For example, a stick feeding device disclosed in Patent Document 1 includes two stick lifting members and a stick receiving frame for feeding sticks one by one. A bottom surface inside a hopper is inclined such that the stick moves downstream, and is configured to hold the stick by the rearward tilting stick receiving frame. One of the stick lifting members is lifted to feed one stick to an upper end surface of the stick receiving frame. The sticks arranged in parallel on the upper end surface of the stick receiving frame are lifted by the other stick lifting member to send the sticks to a chute one by one.

A rod member feeding device disclosed in Patent Document 2 includes a gate plate and a push-up portion for feeding rod members one by one. A bottom surface of a stacking portion is inclined such that the rod member moves downstream, and is configured to hold the rod member by a vertical wall. The push-up portion pushes up the rod member and pushes up the rod member to an inclined portion that guides the rod member downstream. By damming an upstream side of the inclined portion with the gate plate, the rod members can be controlled to be fed one by one.

CITATION LIST

Patent Document

Patent Document 1: JP-A-2016-086726
Patent Document 2: JP-A-2016-150825

However, in the stick feeding device of Patent Document 1, the sticks are fed one by one by pushing up the sticks in two stages using the two stick lifting members, and there are various problems such as difficulty of controlling and driving the stick lifting members, complexity of the device, and a risk of pushing up a plurality of sticks.

The rod member feeding device of Patent Document 2 also has various problems, such as difficulty in controlling and driving the gate plate and the push-up portion, and complexity of the device.

In view of such circumstances, an object of the present invention is to provide a stick pick-up device which has a simple structure, is easy to control, and is capable of reliably picking up sticks one by one.

SUMMARY OF THE INVENTION

In order to achieve the above object of the present invention, the stick pick-up device according to the present invention includes: a stick stock portion configured to store a plurality of sticks and including a stick receiving portion that is inclined down toward a downstream side such that the sticks move in a direction of a short side of the sticks; a reverse inclined wall provided on the downstream side of the stick receiving portion of the stick stock portion and having a reverse inclined surface inclined in a direction covering over a stick receiving portion side; and a push-up portion provided on a reverse inclined surface side of the reverse inclined wall, having a stick push-up surface that is inclined down toward the downstream side with respect to a horizontal direction, and configured to push up the sticks on the stick push-up surface one by one along the reverse inclined surface of the reverse inclined wall and to cause the sticks to move downstream over the reverse inclined wall.

Here, the top of the reverse inclined wall may be inclined down toward the downstream side.

The stick push-up surface of the push-up portion may be pushed up higher than the top of the reverse inclined wall.

A length of the stick push-up surface of the push-up portion in a thickness direction from the reverse inclined surface of the reverse inclined wall may be smaller than a diameter and larger than a radius of the stick.

The push-up portion may have two stick push-up surfaces such that both ends or the vicinity of both ends in a longitudinal direction of the stick can be pushed up.

A height of the top of the reverse inclined wall may be larger than a storable height of the stick stock portion.

The stick pick-up device of the present invention has advantages of having a simple structure, being easy to control, and being able to reliably pick up sticks one by one.

DETAILED DESCRIPTION OF THE PREFERRED EMBODIMENTS

Hereinafter, embodiments of the present invention will be described with reference to shown examples. A stick pick-up device is used to pick up sticks for suspending food one by one. The stick pick-up device may be used for sending the sticks one by one to a downstream device, specifically, for example, a stick hanging device configured to suspend food on the stick, or a stick curvature correction device configured to correct a curvature of the stick.

Figure 1:
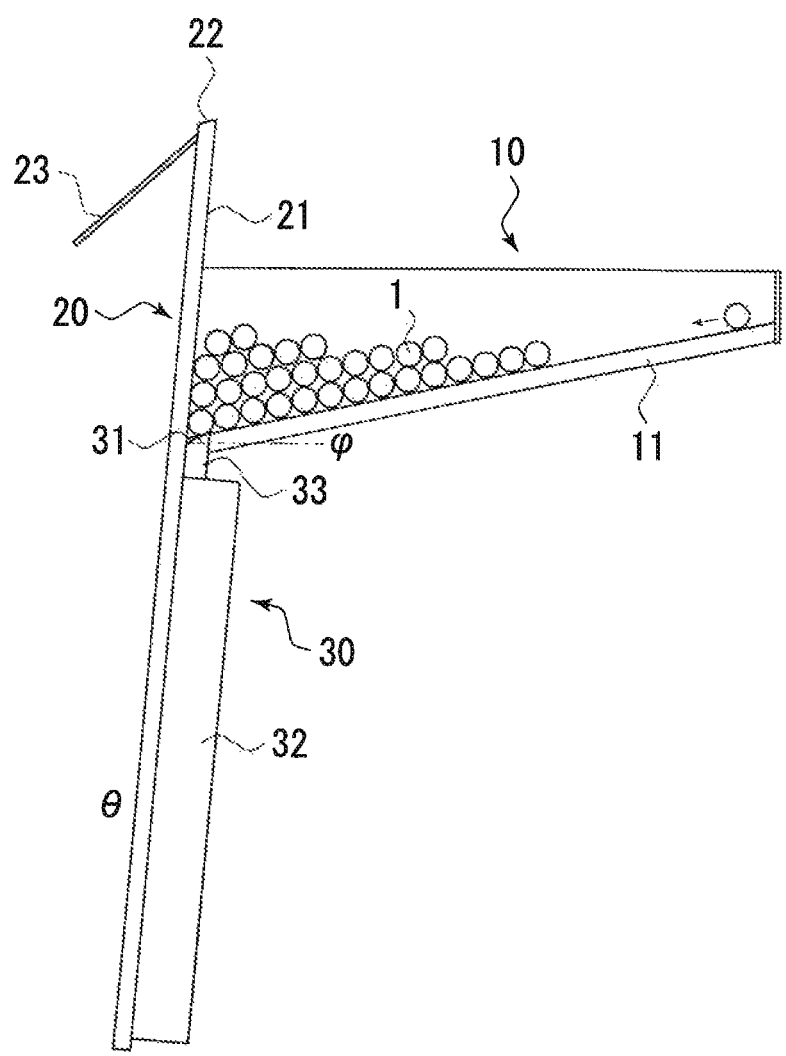
FIG. 1 is a schematic side view for illustrating a stick pick-up device of the present invention.

FIG. 1 is a schematic side view for illustrating the stick pick-up device of the present invention. As shown in FIG. 1, the stick pick-up device of the present invention mainly includes a stick stock portion 10, a reverse inclined wall 20, and a push-up portion 30.

The stick stock portion 10 can store a plurality of sticks 1. The stick stock portion 10 includes a stick receiving portion 11. The stick receiving portion 11 is inclined down toward a downstream side such that the sticks 1 move in a direction of a short side of the sticks. That is, when the plurality of sticks 1 are put into the stick stock portion 10, the plurality of sticks 1 move so as to gather on the downstream side. In FIG. 1, a right side is an upstream side and a left side is the downstream side.

The reverse inclined wall 20 is provided on the downstream side of the stick receiving portion 11 of the stick stock portion 10. The reverse inclined wall 20 has a reverse inclined surface 21 that is inclined in a direction of covering over a stick receiving portion 11 side. That is, the reverse inclined wall 20 is not erected vertically, but disposed so as to be inclined toward the stick receiving portion 11 side. An inclination angle θ of the reverse inclined surface 21 is preferably about 3 degrees to 20 degrees from a vertical direction, and more specifically, for example, about 5 degrees. The inclination angle θ is not particularly limited to a specific example. For example, a hopper 23 is appropriately provided on the downstream side of the reverse inclined wall 20, and the picked-up stick 1 may be sent to another device on the downstream side. In the shown example, the reverse inclined wall 20 itself is disposed so as to be inclined toward the stick receiving portion 11 side, but the present invention is not limited thereto. For example, although the reverse inclined wall 20 itself is erected vertically, only the reverse inclined surface 21 may be configured to be inclined in the direction of covering over the stick receiving portion 11 side. That is, the reverse inclined wall 20 is configured such that a thickness increases from a bottom to a top 22, a surface of the reverse inclined wall 20 at the downstream side may be vertical, whereas the reverse inclined surface 21 may be configured to be inclined toward the stick receiving portion 11 side. The surface of the reverse inclined wall 20 at the downstream side may be configured to be inclined downstream.

The push-up portion 30 is provided on a reverse inclined surface 21 side of the reverse inclined wall 20. The push-up portion 30 has a stick push-up surface 31. The stick push-up surface 31 is configured to push up the stick 1. The stick push-up surface 31 is configured to be inclined down toward the downstream side with respect to a horizontal direction. That is, the stick push-up surface 31 is inclined such that the downstream side is lower than the horizontal. An inclination angle φ of the stick push-up surface 31 is preferably about 10 degrees to 50 degrees from the horizontal direction, and more specifically about, for example, 35 degrees. The inclination angle φ is not particularly limited to a specific example. As will be described later, the inclination angle θ and the inclination angle φ may be adjusted appropriately such that the sticks 1 other than the stick 1 directly on the stick push-up surface 31 fall to the stick receiving portion 11 side before reaching the top 22 of the reverse inclined wall 20, and only one stick 1 directly on the stick push-up surface 31 remains without falling. The stick push-up surface 31 does not have to be a flat inclined surface as in the shown example. As long as the stick push-up surface 31 is inclined down toward the downstream side, the stick push-up surface 31 may, for example, be implemented by a plurality of steps, include a protruding portion on the upstream side, or be implemented by a curved surface. That is, the stick push-up surface 31 that is inclined down toward the downstream side with respect to the horizontal direction includes one implemented by a plurality of steps, one including a protruding portion on the upstream side, one implemented by a curved surface, or the like, and may be any surface that allows the stick 1 to move downstream. The push-up portion 30 pushes up the sticks 1 on the stick push-up surface 31 one by one along the reverse inclined surface 21 of the reverse inclined wall 20, and causes the sticks 1 to move downstream over the reverse inclined wall 20. Specifically, the push-up portion 30 includes an actuator 32 such as an air cylinder or a hydraulic cylinder, and a push-up member 33 connected to the actuator 32, and an upper surface of the push-up member 33 may be configured as the stick push-up surface 31. The push-up portion 30 is not limited to the actuator as long as the push-up portion is configured such that the stick push-up surface 31 pushes up the sticks 1 along the reverse inclined surface 21, and the push-up portion 30 may have any structure, such as one using a rack and pinion gear and a motor, one using a ball screw, or the like. The push-up portion 30 can be applied to any device present in the related art or developed in the future as long as the push-up portion is configured such that the stick push-up surface 31 pushes up the sticks 1 along the reverse inclined surface 21.

Figure 2A:
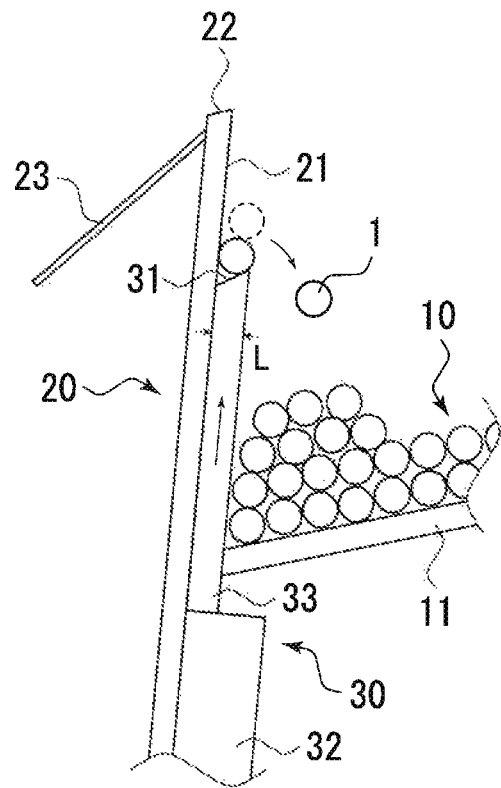
FIGS. 2A and 2B are schematic side views for illustrating how sticks are pushed up by a push-up portion of the stick pick-up device of the present invention.
Figure 2B:
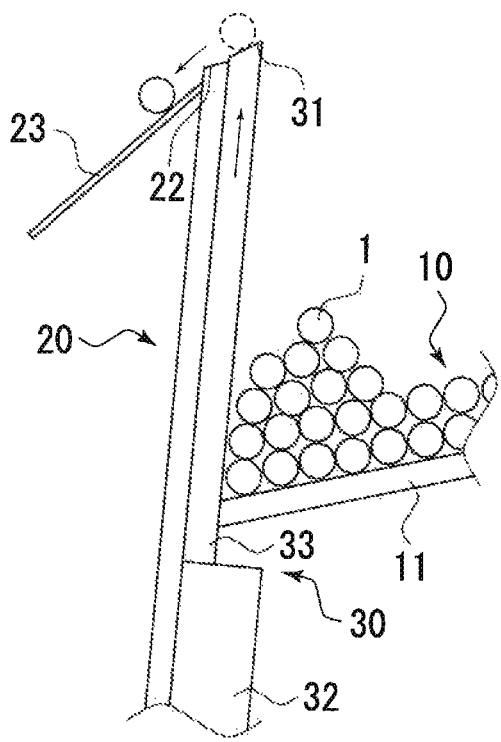

How the sticks 1 are pushed up by the push-up portion 30 is illustrated with reference to FIGS. 2A and 2B. FIGS. 2A and 2B are schematic side views for illustrating how the sticks are pushed up by the push-up portion of the stick pick-up device of the present invention. FIG. 2A shows a state in which the sticks are being pushed up, and FIG. 2B shows a state in which the stick moves downstream over the reverse inclined wall. In FIGS. 2A and 2B, parts having the same reference numerals as in FIG. 1 represent the same objects. First, as shown in FIG. 2A, even though the plurality of sticks 1 are on the stick push-up surface 31, the push-up portion 30 pushes the sticks up along the reverse inclined surface 21 as they are. Then, since the reverse inclined surface 21 of the reverse inclined wall 20 is configured to be inclined toward the stick receiving portion 11 side, the sticks 1 other than the one stick directly on the stick push-up surface 31 fall to the stick receiving portion 11 side by its own weight. That is, due to the inclination of the reverse inclined surface 21, the sticks 1 other than the stick 1 directly on the stick push-up surface 31 fall to the stick receiving portion 11 side before reaching the top 22 of the reverse inclined wall 20. Since the stick push-up surface 31 is inclined down toward the downstream side with respect to the horizontal, only one stick 1 directly on the stick push-up surface 31 remains without falling. Therefore, the push-up portion 30 makes it possible to move the only one stick 1 on the stick push-up surface 31 to a top 22 side of the reverse inclined wall 20.

As shown in FIG. 2B, when the stick 1 is pushed up to the top 22 of the reverse inclined wall 20 along the reverse inclined surface 21 by the push-up portion 30, since the stick push-up surface 31 is configured to be inclined down toward the downstream side with respect to the horizontal direction, the stick 1 moves downstream due to its own weight over the reverse inclined wall 20. Accordingly, the sticks 1 can be picked up one by one. In the example shown in FIG. 2B, the stick push-up surface 31 of the push-up portion 30 is configured to be pushed up higher than the top 22 of the reverse inclined wall 20. Accordingly, the sticks 1 can be reliably moved downstream. However, the present invention is not limited thereto, and it is sufficient to push up the stick push-up surface 31 to such an extent that the stick push-up surface 31 and the top 22 are flush with each other. The stick 1 reliably moves downstream by its own weight due to the inclination of the stick push-up surface 31.

As described above, since the stick pick-up device of the present invention has a simple structure in which the stick is simply pushed up by the push-up portion, the control is easy and the sticks can be reliably picked up one by one. According to the stick pick-up device of the present invention, since the sticks can be picked up one by one by only pushing up the sticks with the push-up portion along the reverse inclined surface, no portion that squeezes hands of an operator during operation is present. Therefore, although protection of a cover or the like is unnecessary, the safety is high.

Here, the stick push-up surface 31 of the push-up portion 30 is for pushing up the sticks 1 one by one. Therefore, as shown in FIGS. 2A and 2B, a length L in the thickness direction of the stick push-up surface 31 from the reverse inclined surface 21 of the reverse inclined wall 20 may be such that only one stick 1 can ride thereon. That is, the length L may be smaller than 1.5 times of a diameter and larger than a radius of the stick 1. However, the length L is preferably smaller than the diameter and larger than the radius of the stick 1 so as not to interfere with the stick 1 that is not in contact with the reverse inclined surface 21 when the stick is pushed up.

The example in which the top 22 of the reverse inclined wall 20 in FIGS. 2A and 2B is inclined down toward the downstream side with respect to the horizontal direction is shown. According to such a configuration, combined with the inclination of the stick push-up surface 31 of the push-up portion 30, the stick 1 can be prevented from remaining on the stick push-up surface 31 when the stick push-up surface 31 pushes up the stick 1 to the top 22 of the reverse inclined wall 20. If an inclination angle of the stick push-up surface 31 of the push-up portion 30 is steeper than an inclination angle of the top 22 of the reverse inclined wall 20, the stick 1 can move downstream more smoothly. The inclination angle of the stick push-up surface 31 does not have to be steeper than that of the top 22, and may be gentler than that of the top 22 as long as the stick 1 moves downstream due to its own weight.

Here, when referring again to FIG. 1, a height of the top 22 of the reverse inclined wall 20 is larger than a storable height of the stick stock portion 10. The top does not have to be higher, but a problem may be present when a large number of sticks 1 are stored in the stick stock portion 10 up to a storable upper limit. That is, there is a possibility that when the stick 1 is pushed up by the push-up portion 30, no space is present for the sticks other than the one stick 1 on the stick push-up surface 31 to fall to the stick receiving portion 11 side. Therefore, by configuring the height of the reverse inclined wall 20 to be larger than the storable height of the stick stock portion 10, the sticks other than the one stick 1 on the stick push-up surface 31 can reliably fall.

Figure 3:
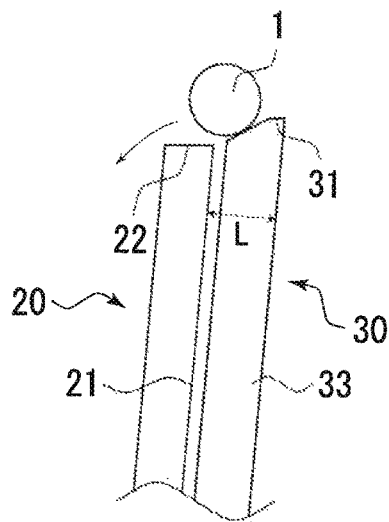
FIG. 3 is a schematic side view for illustrating another example of a top of a reverse inclined wall and a stick push-up surface of the push-up portion of the stick pick-up device of the present invention.

Next, another example of the top 22 of the reverse inclined wall 20 and the stick push-up surface 31 of the push-up portion 30 will be illustrated with reference to FIG. 3. FIG. 3 is a schematic side view for illustrating another example of the top of the reverse inclined wall and the stick push-up surface of the push-up portion of the stick pick-up device of the present invention. In FIG. 3, parts having the same reference numerals as in FIG. 1 represent the same objects. The above shown example shows that the top 22 of the reverse inclined wall 20 is inclined down toward the downstream side. However, in the example shown in FIG. 3, the top 22 is implemented by a horizontal plane. If a thickness of the top 22 is small enough to allow the stick 1 to move smoothly downstream, the top 22 may be implemented by the horizontal plane as in the shown example. If a gap is present between the reverse inclined surface 21 and the push-up member 33 of the push-up portion 30, the length L in the thickness direction including the gap from the reverse inclined surface 21 may be smaller than the diameter and larger than the radius of the stick 1. The stick push-up surface 31 is not limited to one being implemented only by a surface that is inclined such that the downstream side is lower than the horizontal, and as in the shown example, a tip portion of the stick push-up surface 31 may have a chamfered shape. That is, it is sufficient that most of the tip portion of the push-up member 33 has a stick push-up surface having an inclined surface that is lower on the downstream side.

Figure 4:
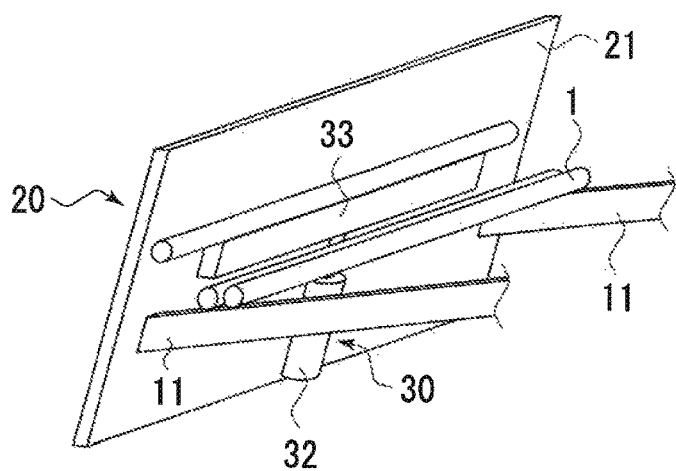
FIG. 4 is a schematic perspective view for illustrating details of the push-up portion of the stick pick-up device of the present invention.

Next, details of the push-up portion 30 will be illustrated with reference to FIG. 4. FIG. 4 is a schematic perspective view for illustrating the details of the push-up portion of the stick pick-up device of the present invention. In FIG. 4, parts having the same reference numerals as in FIG. 1 represent the same objects. As shown in FIG. 4, the push-up portion 30 may include the actuator 32 and the push-up member 33. The actuator 32 and the push-up member 33 are arranged in a T shape, and the push-up member 33 is configured to move in an up-down direction along the reverse inclined surface 21 by driving of the actuator 32. As described above, the upper surface of the push-up member 33 is configured as the stick push-up surface 31. The push-up member 33 is arranged in parallel with the longitudinal direction of the stick 1, is shorter than the stick 1, and further has a length that allows the push-up member to pass between the two stick receiving portions 11.

Figure 5:
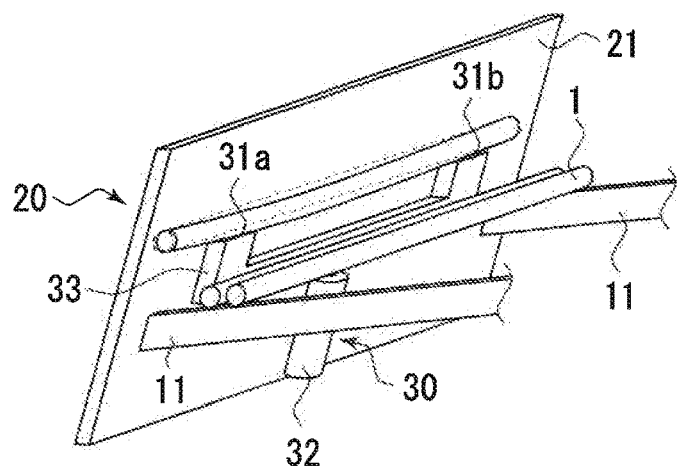
FIG. 5 is a schematic perspective view for illustrating details of another example of the push-up portion of the stick pick-up device of the present invention.

In the example shown in FIG. 4, the push-up portion 30 pushes up the stick 1 by a predetermined length in the longitudinal direction with a surface. However, the present invention is not limited thereto. FIG. 5 is a schematic perspective view for illustrating details of another example of the push-up portion of the stick pick-up device of the present invention. In FIG. 5, parts having the same reference numerals as in FIG. 1 represent the same objects. As shown in FIG. 5, the push-up portion 30 may include two stick push-up surfaces 31a and 31b. That is, the push-up member 33 is configured to push up the vicinity of both ends of the stick 1 in the longitudinal direction. Specifically, it is sufficient that only the vicinity of the both ends of the stick 1 can be pushed up without touching the vicinity of a center of the stick 1. The vicinity of the both ends may be a portion away from the vicinity of the center of the inside of the both ends to some extent. The both ends are also allowed. In the shown example, the push-up member 33 has a concave shape, and tips of portions extending upward at the both ends have the stick push-up surfaces 31a and 31b.

In this way, the stick pick-up device using the push-up portions 30 configured to push up the both ends or the vicinity of the both ends of the stick 1 in the longitudinal direction has the following merit. That is, even if the stick 1 is curved, the push-up portion 30 can reliably push up the sticks 1 on the stick push-up surfaces 31a and 31b one by one along the reverse inclined surface 21 of the reverse inclined wall 20. Specifically, in a case where the stick 1 is curved in an arched shape, when the both ends or the vicinity of the both ends of the stick 1 in the longitudinal direction are pushed up by the stick push-up surfaces 31a and 31b, the vicinity of the center of the stick 1 bends downward due to the own weight of the stick and rotates. In this case, the stick 1 does not fall from the stick push-up surfaces 31a and 31b. Therefore, even if the stick 1 is curved, the stick 1 can be reliably pushed up. In the case corresponding to the curved stick, since the vicinity of the center of the stick 1 bends downward, the stick push-up surfaces 31a and 31b of the push-up portion 30 may be pushed up higher than the top 22 of the reverse inclined wall 20.

Figure 6:
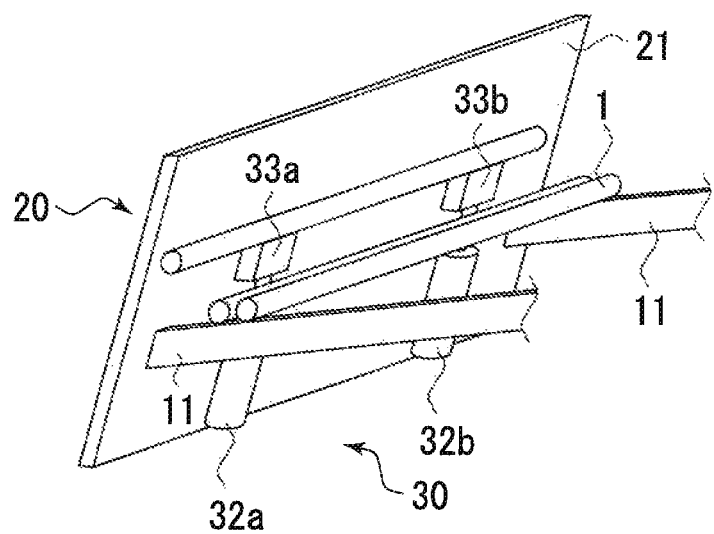
FIG. 6 is a schematic perspective view for further illustrating details of another example of the push-up portion of the stick pick-up device of the present invention.

As shown in FIG. 6, the push-up portion 30 may include a plurality of actuators. FIG. 6 is a schematic perspective view for further illustrating details of another example of the push-up portion of the stick pick-up device of the present invention. In FIG. 6, parts having the same reference numerals as in FIG. 1 represent the same objects. As shown in FIG. 6, the push-up portion 30 may use a plurality of actuators 32*a* and 32*b*. A push-up member 33*a* is connected to the actuator 32*a*, and a push-up member 33*b* is connected to the actuator 32*b*. The actuator 32*a* and the actuator 32*b* are configured to move in the up-down direction along the reverse inclined surface 21 in linkage with the push-up members 33*a* and 33*b*. In this way, the plurality of actuators may be used to push up a plurality of points in the longitudinal direction of the stick 1. Also in such a configuration, even if the stick 1 is curved as described above, the sticks can be reliably picked up one by one.

The stick pick up device of the present invention is not limited to the above shown examples, and of course, various changes can be made without departing from the gist of the present invention.

What is claimed is:

1. A stick pick-up device configured to pick up sticks for suspending food one by one, the stick pick-up device comprising:
    a stick stock portion configured to store a plurality of sticks and including a stick receiving portion that is inclined down toward a downstream side such that the sticks move in a direction of a short side of the sticks;
    a reverse inclined wall provided on the downstream side of the stick receiving portion of the stick stock portion and having a reverse inclined surface inclined in a direction covering over a stick receiving portion side; and
    a push-up portion provided on a reverse inclined surface side of the reverse inclined wall, having a stick push-up surface that is inclined down toward the downstream side with respect to a horizontal direction, and configured to push up the sticks on the stick push-up surface one by one along the reverse inclined surface of the reverse inclined wall and to cause the sticks to move downstream over the reverse inclined wall.

2. The stick pick-up device according to claim 1, wherein the top of the reverse inclined wall is inclined down toward the downstream side.

3. The stick pick-up device according to claim 1, wherein the stick push-up surface of the push-up portion is pushed up higher than the top of the reverse inclined wall.

4. The stick pick-up device according to claim 1, wherein a length of the stick push-up surface of the push-up portion in a thickness direction from the reverse inclined surface of the reverse inclined wall is smaller than a diameter and larger than a radius of the stick.

5. The stick pick-up device according to claim 1, wherein the push-up portion has two stick push-up surfaces such that both ends or the vicinity of both ends in a longitudinal direction of the stick can be pushed up.

6. The stick pick-up device according to claim 1, wherein a height of the top of the reverse inclined wall is larger than a storable height of the stick stock portion.

* * * * *